United States Patent
Williams et al.

(10) Patent No.: US 6,966,398 B2
(45) Date of Patent: Nov. 22, 2005

(54) APPARATUS FOR CONTROLLING A POWER-ASSISTED STEERING GEAR IN RESPONSE TO VEHICLE SPEED

(75) Inventors: Daniel E. Williams, West Lafayette, IN (US); Juan Redin, Pamplona (ES); Philip S. Peterson, Monticello, IN (US); William A. Szabela, Brookston, IN (US)

(73) Assignee: TRW Automotive U.S. LLC, Livonia, MI (US)

( * ) Notice: Subject to any disclaimer, the term of this patent is extended or adjusted under 35 U.S.C. 154(b) by 0 days.

(21) Appl. No.: 10/397,613

(22) Filed: Mar. 26, 2003

(65) Prior Publication Data

US 2004/0188169 A1    Sep. 30, 2004

(51) Int. Cl.[7] .............................................. B62D 5/06
(52) U.S. Cl. ...................................................... 180/421
(58) Field of Search ......................... 180/421, 402–407; 1/423, 443, 446

(56) References Cited

U.S. PATENT DOCUMENTS

| | | | |
|---|---|---|---|
| 3,280,557 A | 10/1966 | Sattavara | |
| 3,696,613 A | 10/1972 | Goodale | |
| 3,727,404 A * | 4/1973 | Brewer | 60/430 |
| 3,935,918 A | 2/1976 | Hicks et al. | |
| 3,939,938 A | 2/1976 | Inoue | |
| 3,991,846 A * | 11/1976 | Chichester et al. | 180/403 |
| 4,237,993 A | 12/1980 | Jablonsky | |
| 4,392,540 A | 7/1983 | Michio et al. | |
| 4,394,999 A | 7/1983 | Botzler | |
| 4,410,057 A | 10/1983 | Johnson | |
| 4,625,624 A * | 12/1986 | Adams | 91/375 A |
| 4,738,330 A * | 4/1988 | Suzuki et al. | 180/421 |
| 5,119,898 A | 6/1992 | Eckhardt et al. | |
| 5,564,516 A * | 10/1996 | Nimblett et al. | 180/423 |
| 5,709,281 A | 1/1998 | Sherwin et al. | |
| 5,931,256 A * | 8/1999 | Langkamp | 180/422 |
| 6,138,788 A * | 10/2000 | Bohner et al. | 180/405 |
| 6,152,254 A * | 11/2000 | Phillips | 180/422 |
| 6,336,519 B1 | 1/2002 | Bohner et al. | |
| 6,354,393 B1 | 3/2002 | Ahlert et al. | |
| 6,367,575 B1 | 4/2002 | Bohner et al. | |
| 6,382,342 B1 | 5/2002 | Peppler | |
| 6,442,462 B1 | 8/2002 | Nishizaki et al. | |
| 6,655,709 B2 | 12/2003 | Sherwin et al. | |

FOREIGN PATENT DOCUMENTS

| | | |
|---|---|---|
| EP | 0580997 | 2/1994 |
| EP | 1006041 | 6/2000 |
| EP | 1213205 | 6/2002 |
| GB | 2122150 | 1/1984 |

* cited by examiner

*Primary Examiner*—Lesley D. Morris
*Assistant Examiner*—Paul Royal, Jr.
(74) *Attorney, Agent, or Firm*—Tarolli, Sundheim, Covell & Tummino L.L.P.

(57) ABSTRACT

An apparatus (10) for helping to turn steerable wheels (12) of a vehicle comprises a hydraulic power-assisted steering gear (16). An electric motor (92) actuates the steering gear (16). A pump (84) supplies the steering gear (16) with hydraulic fluid. A vehicle speed sensor (102) senses vehicle speed and provides a vehicle speed signal. A controller (104) is responsive to the vehicle speed signal for controlling the pump (84). The controller (104) activates the pump (84) to supply hydraulic fluid to the steering gear (16) when the vehicle speed signal indicates a vehicle speed below a predetermined value and the controller (104) deactivating the pump (84) when the vehicle speed signal indicates a vehicle speed above the predetermined value.

18 Claims, 7 Drawing Sheets

APPARATUS FOR CONTROLLING A POWER-ASSISTED STEERING GEAR IN RESPONSE TO VEHICLE SPEED

TECHNICAL FIELD

The present invention relates to an apparatus for controlling a power-assisted steering gear in response to vehicle speed.

BACKGROUND OF THE INVENTION

A conventional hydraulic power-assisted steering system includes a steering gear having a hydraulic motor. A fluid pump draws hydraulic fluid from a fluid reservoir and supplies the hydraulic fluid to the steering gear. Typically, the engine of the vehicle powers the pump to supply hydraulic fluid from a fluid reservoir to the steering gear. The steering gear includes a control valve. The control valve is responsive to steering inputs for directing hydraulic fluid to the hydraulic motor. The hydraulic motor is operatively connected to the steerable wheels of the vehicle and, when actuated, helps to turn the steerable wheels.

In the conventional hydraulic power-assisted steering system, hydraulic fluid is continually circulating between the pump, the control valve, and the fluid reservoir. As the speed of the vehicle increases, the need for power-assisted steering decreases. The conventional hydraulic power-assisted steering system operates independently of the vehicle speed.

SUMMARY OF THE INVENTION

The present invention relates to an apparatus for helping to turn steerable wheels of a vehicle. The apparatus comprises a hydraulic power-assisted steering gear. An electric motor actuates the steering gear. A pump supplies the steering gear with hydraulic fluid. A vehicle speed sensor senses vehicle speed and provides a vehicle speed signal. A controller is responsive to the vehicle speed signal for controlling the pump. The controller activates the pump to supply hydraulic fluid to the steering gear when the vehicle speed signal indicates a vehicle speed below a predetermined value and the controller deactivating the pump when the vehicle speed signal indicates a vehicle speed above the predetermined value.

BRIEF DESCRIPTION OF THE DRAWINGS

The foregoing and other features of the present invention will become apparent to those skilled in the art to which the present invention relates upon reading the following description with reference to the accompanying drawings, in which.

DETAILED DESCRIPTION OF THE INVENTION

Figure 1:
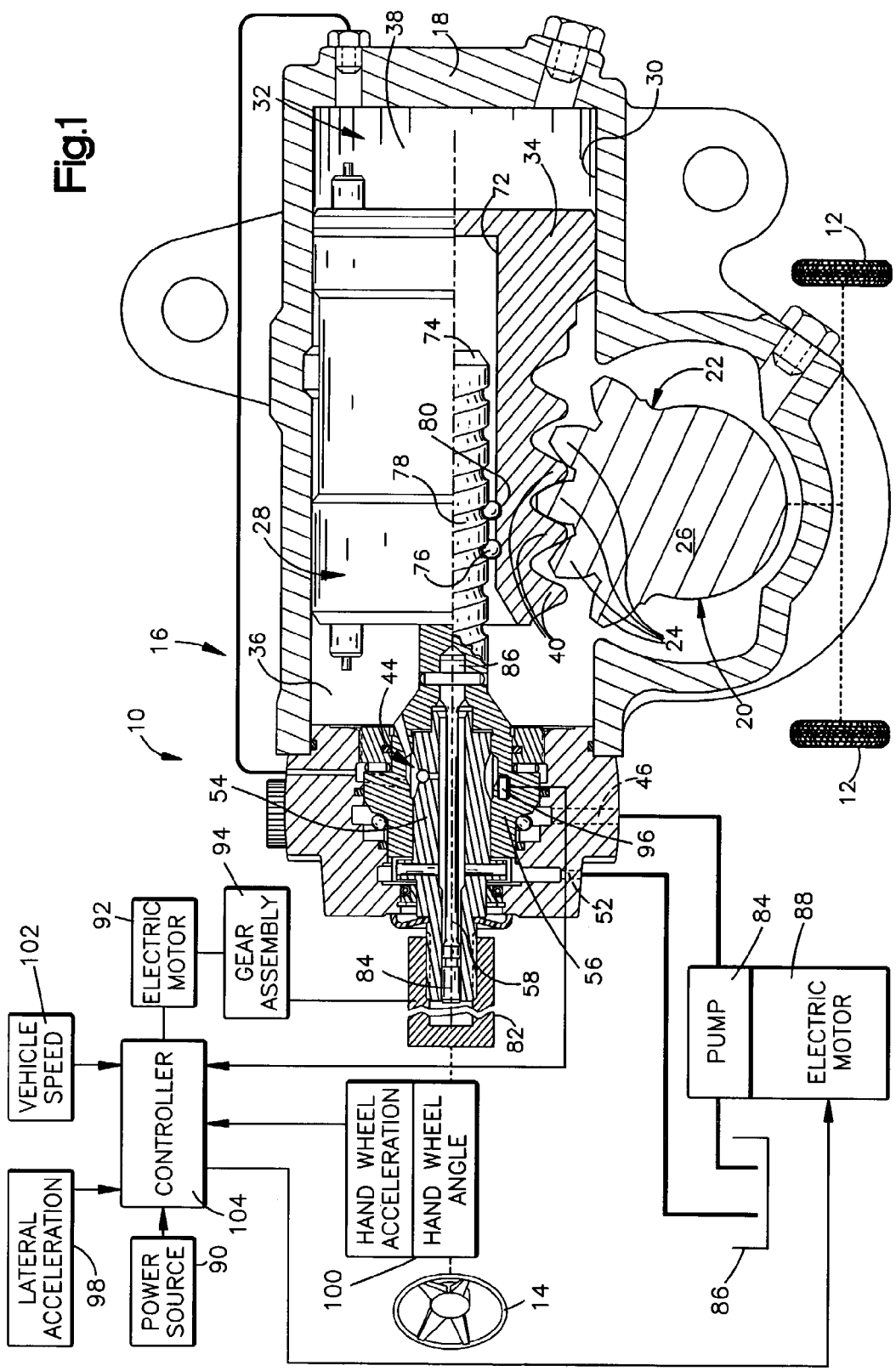
FIG. 1 is a schematic illustration of an apparatus constructed in accordance with the present invention.

FIG. 1 illustrates an apparatus 10 constructed in accordance with the present invention. The apparatus 10 helps to turn steerable wheels 12 of a vehicle in response to rotation of a hand wheel 14 of the vehicle.

The apparatus 10 includes a hydraulic power assisted steering gear 16. The steering gear 16 illustrated in FIG. 1 is an integral hydraulic power assisted steering gear. Other hydraulic power assisted steering gears are contemplated by this invention, for example, the steering gear may be a rack and pinion steering gear.

The steering gear 16 includes a housing 18 and a drive mechanism 20. The drive mechanism 20 is moved in response to rotation of the hand wheel 14 of the vehicle. The motion of the drive mechanism 20 results in a turning of the steerable wheels 12 of the vehicle.

The drive mechanism 20 includes a sector gear 22 having a plurality of teeth 24. The sector gear 22 is fixed on an output shaft 26 that extends outwardly through an opening in the housing 18. The output shaft 26 is typically connected to a pitman arm (not shown) that is connected to the steering linkage of the vehicle. The dashed lines between the output shaft 26 and the steerable wheels 12 in FIG. 1 schematically represent the pitman arm and steering linkage. Thus, as the sector gear 22 rotates, the output shaft 26 is rotated to operate the steering linkage. As a result, the steerable wheels 12 of the vehicle are turned.

The steering gear 16 further includes a hydraulic motor 28 for moving the drive mechanism 20. The hydraulic motor 28 is located within the housing 18 of the steering gear 16. The housing 18 of the steering gear 16 has an inner cylindrical surface 30 defining a chamber 32. A piston 34 is located within the chamber 32 and divides the chamber into opposite chamber portions 36 and 38. One chamber portion 38 is located on a first side of the piston 34 and the other chamber portion 38 is located on a second opposite side of the piston. The piston 34 creates a seal between the respective chamber portions 36 and 38 and is capable of axial movement within the chamber 32. This axial movement of the piston 34 results in an increase in volume of one chamber portion, e.g., 36, and a corresponding decrease in volume of the other chamber portion, e.g., 38.

A series of rack teeth 40 is formed on the periphery of the piston 34. The rack teeth 40 act as an output for the hydraulic motor 28 and mesh with the teeth 24 formed on the sector gear 22 of the drive mechanism 20.

A control valve 44 directs the flow of hydraulic fluid to the hydraulic motor 28. The control valve 44 is located within the housing 18 of the steering gear 16. An inlet 46 provides fluid communication to the control valve 44 and an outlet 52 provides fluid communication away from the control valve.

The control valve 44 is of a conventional design and includes a valve core portion 54 and a valve sleeve portion 56 that are connected together through a torsion bar 58. The control valve 44 directs fluid to an appropriate chamber portion 36 or 38 of the hydraulic motor 28. The flow of hydraulic fluid toward one of the chamber portions 36 or 38 increases the pressure within that chamber portion. When the pressure of one chamber portion, e.g., 36, increases relative to the pressure of the other chamber portion, e.g., 38, the piston 34 moves axially and the volume of the higher-pressure chamber portion increases. The volume of the higher-pressure chamber portion, e.g., 36, increases until the pressure within the chamber portions 36 and 38 equalizes.

As the volume of one chamber portion, e.g., 36, increases, the volume of the other chamber portion, e.g., 38, decreases. The decreasing chamber portion, e.g., 38, is vented to allow a portion of the fluid contained in the decreasing chamber portion to escape. The escaping fluid exits the housing 18 of the steering gear 16 via the outlet 52.

The piston 34 of the hydraulic motor 28 contains a bore 72, partially shown in FIG. 1, which is open toward the control valve 44. The valve sleeve portion 56 and a follow-up member 74 collectively form an integral one-piece unit that is supported for rotation relative to the piston 34 by a plurality of balls 76. The outer periphery 78 of the follow-up member 74 is threaded. The plurality of balls 76 interconnects the threaded outer periphery 78 of the follow-up member 74 with an internal thread 80 formed in the bore 72 of the piston 34. As a result of the interconnecting plurality of balls 76, axial movement of the piston 34 causes the follow-up member 74 and the valve sleeve portion 56 to rotate. The rotation of the follow-up member 74 and the valve sleeve portion 56 returns the control valve 44 to the neutral position.

The valve core portion 54 of the control valve 44 is fixedly connected to an input shaft 82. As shown schematically by dashed lines in FIG. 1, the input shaft 82 is fixedly connected to the hand wheel 14 of the vehicle. Rotation of the hand wheel 14 results in rotation of the input shaft 82 and rotation of the valve core 54.

The torsion bar 84 of the steering gear 16 has first and second ends 84 and 86, respectively. The first end 84 of the torsion bar 58 is fixed relative to the input shaft 82 and the valve core portion 54 of the control valve 44. The second end 86 of the torsion bar 58 is fixed relative to the valve sleeve portion 56 of the control valve 44 and the follow-up member 74.

When the resistance to turning of the steerable wheels 12 of the vehicle is below a predetermined amount, rotation of the hand wheel 14 is transferred through the torsion bar 58 and causes rotation of the follow-up member 74. As a result, the control valve 44 remains in the neutral position. Rotation of the follow-up member 74 causes movement of the piston 34 and results in turning of the steerable wheels 12.

When resistance to turning the steerable wheels 12 of the vehicle is at or above the predetermined amount, rotation of the follow-up member 74 is resisted. As a result, rotation of the hand wheel 14 rotates the first end 84 of the torsion bar 58 relative to the second end 86 of the torsion bar. The rotation of the first end 84 of the torsion bar 58 relative to the second end 86 of the torsion bar results in torsion or twisting across the torsion bar. As a result of torsion across the torsion bar 58, the valve core portion 54 of the control valve 44 rotates relative to the valve sleeve portion 56 of the control valve and the control valve 44, when supplied with hydraulic fluid, directs fluid toward one of the chamber portions 36 or 38 of the hydraulic motor 28.

As discussed above, when fluid is directed toward one of the chamber portions 36 or 38, the piston 34 moves within the chamber 32. Movement of the piston 34 results in turning of the steerable wheels 12 of the vehicle, as well as, rotation of the follow-up member 74. As discussed above, rotation of the follow-up member 74 rotates the valve sleeve portion 56 until the control valve 44 is again in the neutral position. When the control valve 44 is in the neutral position, the torsion across the torsion bar 58 is removed and the first end 84 of the torsion bar is no longer rotated or twisted relative to the second end 86 of the torsion bar.

The apparatus 10 includes a pump 84 that is in fluid communication with the steering gear 16 for supplying hydraulic fluid to the steering gear. The pump 84 draws hydraulic fluid from a fluid reservoir 86 and supplies the hydraulic fluid to the inlet 46 of the steering gear 16. The pump 84 may be of any conventional design. An electric pump motor 88 is operatively connected with the pump 84. The pump motor 88 receives electric power from a power source 90. The power source 90 may be the vehicle battery. When energized, the pump motor 88 drives the pump 84 to supply hydraulic fluid to the steering gear 16.

The apparatus 10 also includes an electric motor 92 for actuating the steering gear 16. The electric motor 92 may be of any conventional design. The electric motor 92 receives electric power from the power source 90. An output shaft (not shown) of the electric motor 92 is connected to the input shaft 82 of the steering gear 16. Preferably, a gear assembly 94 is used to connect the output shaft of the electric motor 92 to the input shaft 82 of the steering gear 16. When the electric motor 92 receives electric power, the output shaft of the electric motor 92 rotates the input shaft 82 of the steering gear 16. Thus, the electric motor 92 is said to be "in series connection" with the hydraulic motor 28.

The apparatus 10 also includes a column torque sensor 96 for sensing column torque and outputting a signal indicative of the column torque. Column torque is related to the torsion across the torsion bar 58 and the material properties of the torsion bar. The column torque sensor 96 may measure the rotational movement of the first end 84 of the torsion bar 58 relative to the second end 86 of the torsion bar. The movement of the valve core portion 54 relative to the valve sleeve portion 56 alternatively may be measured for indicating the relative rotation between the first end 84 and the second end 86 of the torsion bar 58.

The apparatus 10 also includes a plurality of vehicle condition sensors 98, 100 and 102 and a controller 104. Preferably, the vehicle condition sensors include a lateral acceleration sensor 98, a hand wheel rotation sensor 100, and a vehicle speed sensor 102. Each sensor 98, 100 and 102 is electrically connected to the controller 104.

The lateral acceleration sensor 98 senses the lateral acceleration of the vehicle and generates an electrical signal indicative of the sensed lateral acceleration. The hand wheel rotation sensor 100 senses the magnitude, rate, and acceleration of rotation of the vehicle hand wheel 14 and generates electrical signals indicative of these parameters. The hand wheel rotation magnitude is the angle of rotation of the hand wheel 14 relative to a straight ahead position of the hand wheel. Rotation of the hand wheel 14 in a first direction may be designated as a positive value and rotation of the hand wheel 14 in a second direction, opposite the first direction, may be designated as a negative value. The hand wheel rotation sensor 100, or the controller 104, may determine the rate of rotation of the hand wheel 14 by taking a time differential of the magnitude and may determine the hand wheel acceleration by taking a time differential of the rate of rotation. The vehicle speed sensor 102 senses the vehicle speed and generates an electrical signal indicative of the speed.

The controller 104 receives the signals generated by the lateral acceleration sensor 98, the hand wheel rotation sensor 100, and the vehicle speed sensor 102. Additionally, the controller 104 receives the column torque signal from the column torque sensor 96. The controller 104 analyzes the respective signals using a known algorithm and generates a control signal for controlling the electric motor 92. The electric motor 92 is controlled for actuating the steering gear 16 so as to provide a predetermined resistance to rotation of the hand wheel 14.

When the electric motor 92 receives electric power, the output shaft of the electric motor 92, through the gear assembly 94, rotates the input shaft 82 of the steering gear 16. As a result, the electric motor 92 assists the operator in rotating the input shaft 82 of the steering gear 18.

Additionally, the controller 104 compares the signal from the vehicle speed sensor 102 to a predetermined value. When the comparison indicates that the vehicle speed is below the predetermined value, the controller 104 actives the pump 84 to supply hydraulic fluid to the steering gear 16. For example, when the vehicle speed is below twenty kilometers per hour, the controller 104 activates the pump 84. To activate the pump 84 of FIG. 1, the controller 104 controls the pump motor 88 to drive pump 84. When the controller 104 determines that the vehicle speed is greater than the predetermined value, the controller 104 deactivates the pump 84 to discontinue supplying fluid to the steering gear 16. To deactivate the pump 84, the controller 104 shuts down the pump motor 88. Thus, when the controller 104 determines that the vehicle speed is greater than the predetermined value, the controller 104 terminates operation of the hydraulic motor 28 of the steering gear 16.

Figure 2:
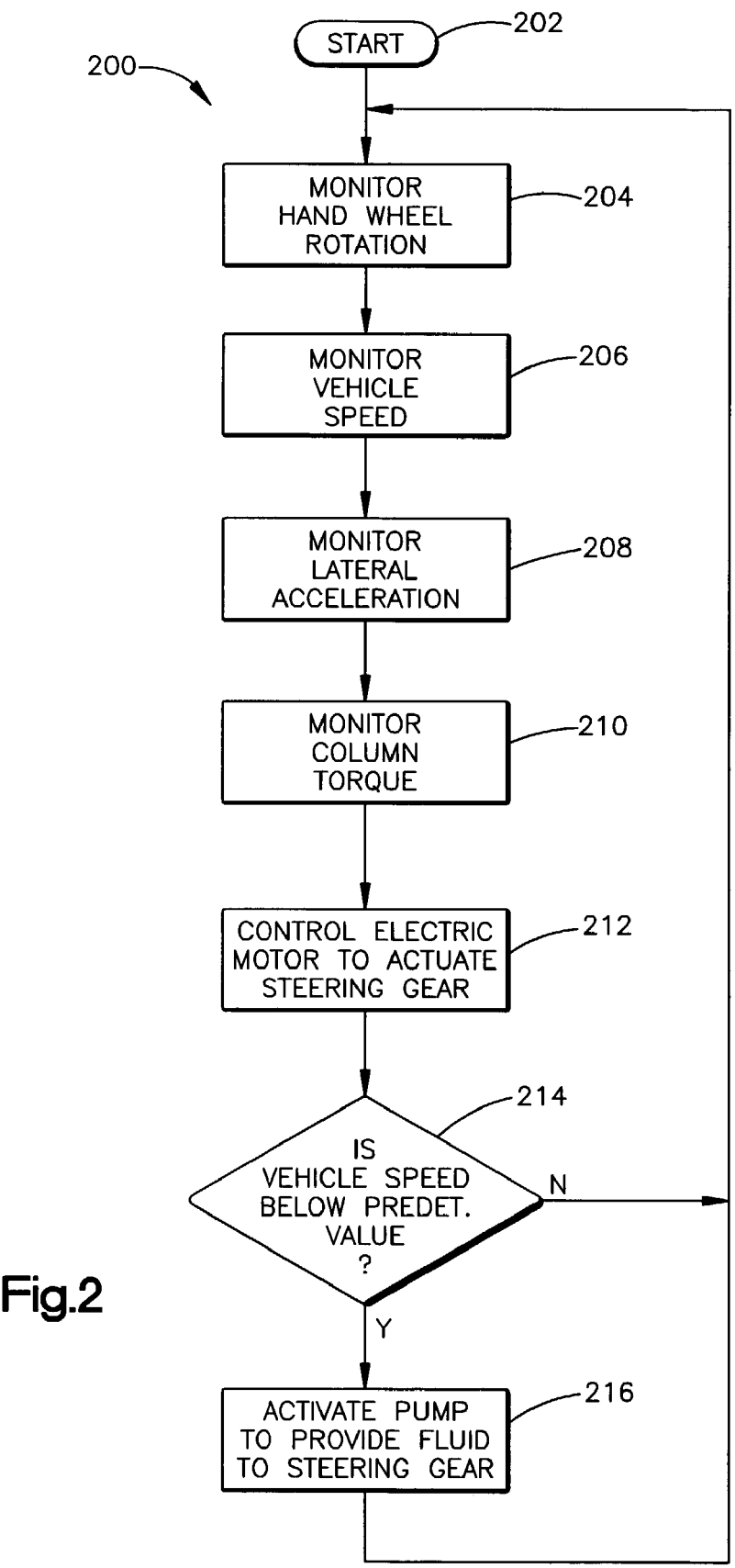
FIG. 2 is a process diagram of a control process for the apparatus of FIG. 1.

FIG. 2 is a flow chart illustrating the process 200 performed by the controller 104 of FIG. 1. The process 200 begins at step 202. At step 204, the controller 104 monitors the handwheel rotation. At step 206, the controller 104 monitors the vehicle speed. At step 208, the controller 104 monitors the lateral acceleration of the vehicle and, the column torque is monitored at step 210. At step 212, the controller 104 analyzes the signals received at steps 204, 206, 208, and 210 and output the control signal to control the electric motor 92. At step 214, a determination is made as to whether the vehicle speed is below a predetermined value. If the determination at step 214 is negative, the process 200 returns to step 204. If the determination at step 214 is affirmative, the process 200 proceeds to step 216. At step 216, the controller 104 activates the pump 84 to supply fluid to the steering gear 16. From step 216, the process 200 returns to step 204.

The apparatus 10 of the present invention provides a power-assisted steering system that includes a hydraulic boost when the vehicle is operating at low speeds. Generally, at lower vehicle speeds, the resistance to rotation of steerable wheels 12 is increased and the magnitude of a turn of the steerable wheels 12 is increased, as compared to while operating a higher vehicle speeds. The apparatus 10 of the present invention aids the vehicle driver in turning the steering wheels 12 while operating at the lower speeds in which additional steering assistance is generally most helpful.

Figure 3:
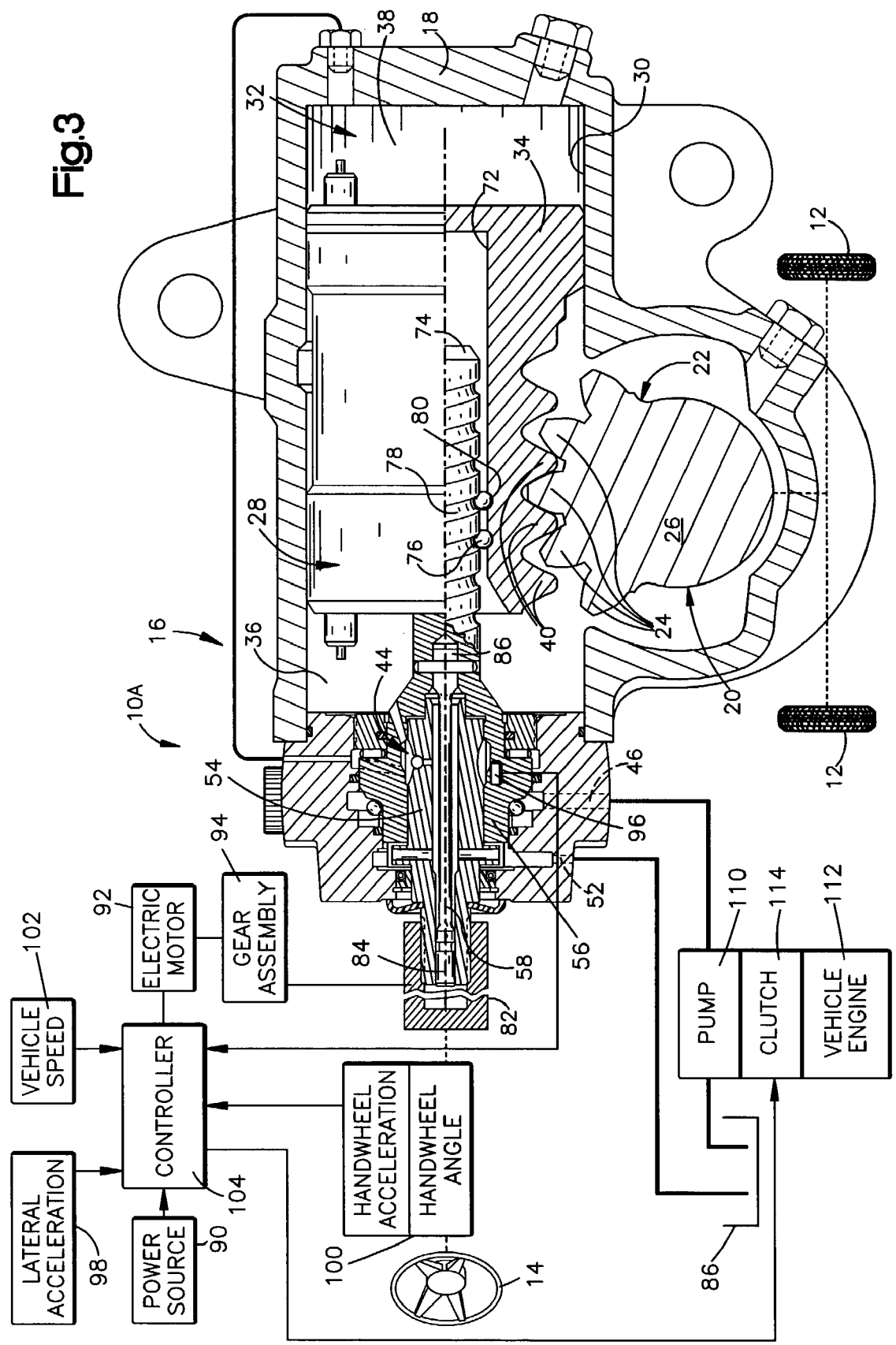
FIG. 3 is a schematic illustration of an apparatus constructed in accordance with a second embodiment of the present invention.

FIG. 3 illustrates an apparatus 10A constructed in accordance with a second embodiment of the present invention. Structures of FIG. 3 that are the same as or similar to structures of FIG. 1 are numbered using the same reference numbers and are not discussed in detail with regard to FIG. 3. Only the differences between the apparatus 10 of FIG. 1 and the apparatus 10A of FIG. 3 are discussed in detail below.

Unlike the pump 84 of the apparatus 10 illustrated in FIG. 1, an electric pump motor 88 does not drive the pump 110 of the apparatus 10A of FIG. 3. The pump 110 of FIG. 3 is operatively connected to the engine 112 of the vehicle and is driven by the engine 112 of the vehicle. A clutch mechanism 114 is interposed between the vehicle engine 112 and the pump 110. The clutch mechanism 114 is actuatable between an engaged condition and a disengaged condition. In the engaged condition, the clutch mechanism 114 mechanically interconnects or couples the vehicle engine 112 and the pump 110 for driving the pump to supply hydraulic fluid to the steering gear 16. In the disengaged condition, the vehicle engine 112 and the pump 110 are not mechanically interconnected, i.e., are decoupled from one another, so that no power is transferred between the vehicle engine 112 and the pump 110. Thus, when the clutch mechanism 114 in the disengaged condition, the pump 110 is deactivated and discontinues supplying hydraulic fluid to the steering gear 16.

The clutch mechanism 114 is operatively connected to the controller 104 and the controller actuates the clutch mechanism 114 between the engaged and disengaged conditions. When the controller 104 determines that the vehicle speed is below the predetermined value (e.g., 20 kph), the controller 104 actuates the clutch mechanism 114 into the engaged condition. When the clutch mechanism 114 is actuated into the engaged condition, the pump 110 is activated to supply hydraulic fluid to the steering gear 16. When the controller 104 determines that the vehicle speed is greater than the predetermined value, the controller 104 actuates the clutch mechanism 114 into the disengaged condition. When the clutch mechanism 114 is in the disengaged condition, the pump 110 is deactivated and discontinues supplying fluid to the steering gear 16. Thus, when the controller 104 determines that the vehicle speed is greater than the predetermined value, the controller 104 terminates operation of the hydraulic motor 28 of the steering gear 16.

In a manner similar to the apparatus 10 of FIG. 1, the apparatus 10A of FIG. 3 provides a hydraulic boost when the vehicle is operating at low speeds. Thus, the apparatus 10A of FIG. 3 aids the vehicle driver in turning the steering wheels 12 while operating at the lower speeds in which additional steering assistance is generally most helpful.

Figure 4:
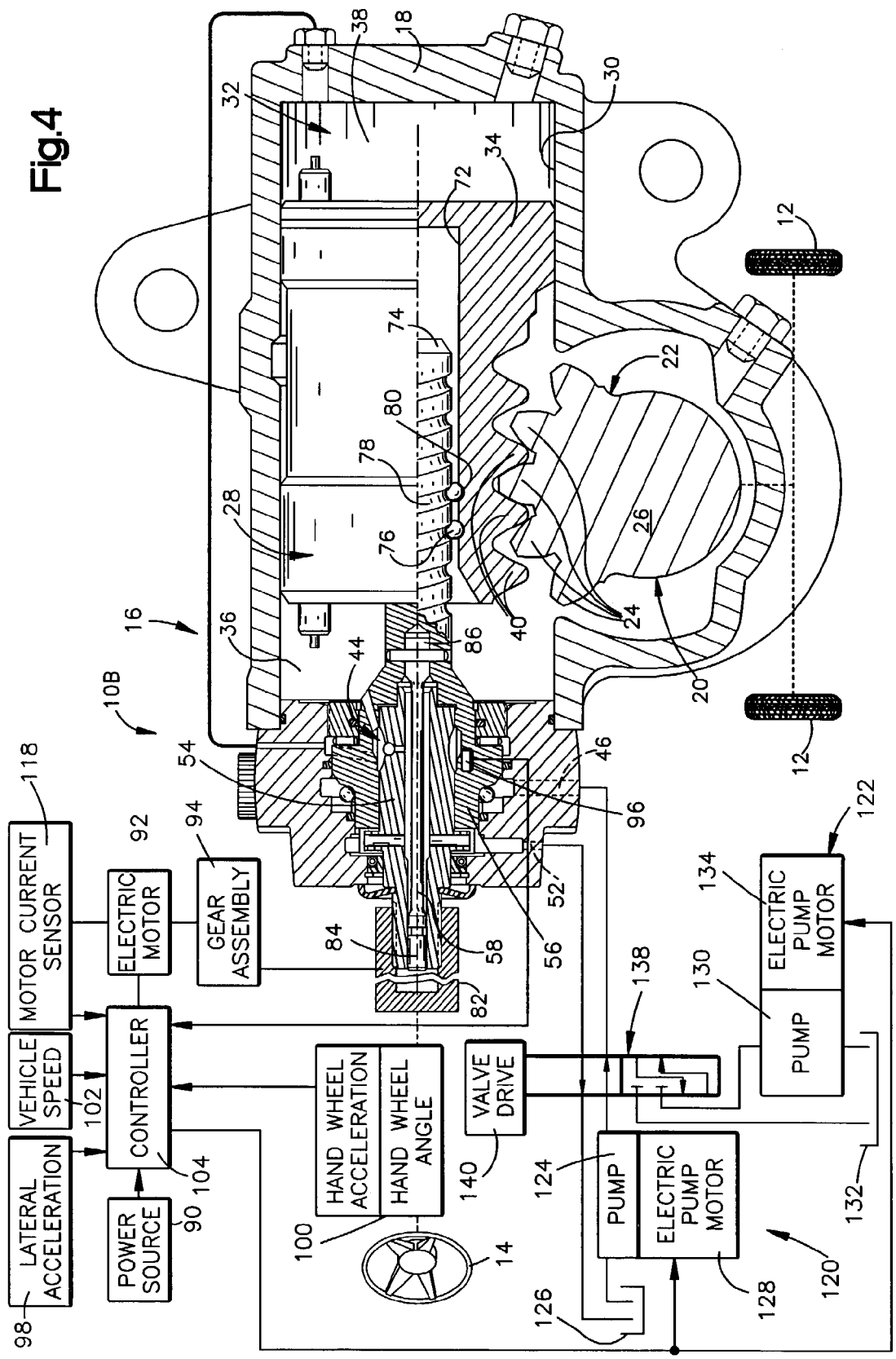
FIG. 4 is a schematic illustration of an apparatus constructed in accordance with a third embodiment of the present invention.

FIG. 4 illustrates an apparatus 10B constructed in accordance with a third embodiment of the present invention. Structures of FIG. 4 that are the same as or similar to structures of FIG. 1 are numbered using the same reference numbers and are not discussed in detail with regard to FIG. 4. Only the differences between the apparatus 10 of FIG. 1 and the apparatus 10B of FIG. 4 are discussed in detail below.

The apparatus 10B of FIG. 4 includes a motor current sensor 118 for sensing the actual current of the electric motor 92 and for providing a motor current signal indicative of the sensed current. The motor current sensor 118 is operatively connected to the controller 104. The controller 104 receives the motor current signal from the motor current sensor 118 and uses the motor current signal to determine the output torque of the electric motor 92.

Additionally, the apparatus 10B of FIG. 4 includes first and second fluid supply systems 120 and 122, respectively, each for supplying hydraulic fluid to the steering gear 16. The first fluid supply system 120 includes a first pump 124 and a first reservoir 126. The first pump 124 draws hydraulic fluid from the first reservoir 126. A first electric pump motor 128 is operatively connected with the first pump 124. When energized, the first pump motor 128 drives the first pump 124 to supply hydraulic fluid to the steering gear 16.

Hydraulic fluid returned from the steering gear 16 to the first fluid supply system 120 is directed into the first reservoir 126.

The second fluid supply system 122 includes a second pump 130 and a second reservoir 132. The second pump 130 draws hydraulic fluid from the second reservoir 132. A second electric pump motor 134 is operatively connected with the second pump 130. When energized, the second pump motor 134 drives the second pump 130 to supply hydraulic fluid to the steering gear 16. Hydraulic fluid returned from the steering gear 16 to the second fluid supply system 122 is directed into the second reservoir 132.

The apparatus 10B of FIG. 4 also includes a two-position valve assembly 138. The two-position valve assembly 138 is interposed between the first and second pumps 124 and 130 and the inlet 46 and the steering gear 16. The two-position valve assembly also is interposed between the outlet 52 of the steering gear 16 and the first and second reservoirs 126 and 132.

In a first position, illustrated in FIG. 4, the two-position valve assembly 138 places the first fluid supply system 120 in fluid communication with the steering gear 16. Thus, when in the first position, the two-position valve places the first pump 124 and the first reservoir 126 in fluid communication with the steering gear 16. Also, when the two-position valve assembly 138 is in the first position, the second fluid supply system 122 is isolated from fluid communication with the steering gear 16.

In a second position, the two-position valve assembly 138 places the second fluid supply system 122 in fluid communication with the steering gear 16. Thus, when in the second position, the two-position valve assembly 138 places the second pump 130 and the second reservoir 132 in fluid communication with the steering gear 16. Also, when the two-position valve assembly 138 is in the second position, the first fluid supply system 120 is isolated from fluid communication with the steering gear 16.

A valve drive 140 is connected with the two-position valve assembly 138 for positioning of the two-position valve assembly. Preferably, the valve drive 140 is a solenoid. The valve drive 140 is operatively connected to the controller 104. The controller 104 controls the valve drive 140. Thus, the controller 104 controls the position of the two-position valve assembly 138 between the first and second positions for selectively placing either the first or second fluid supply system 120 or 122 in fluid communication with the steering gear 16.

Figure 5:
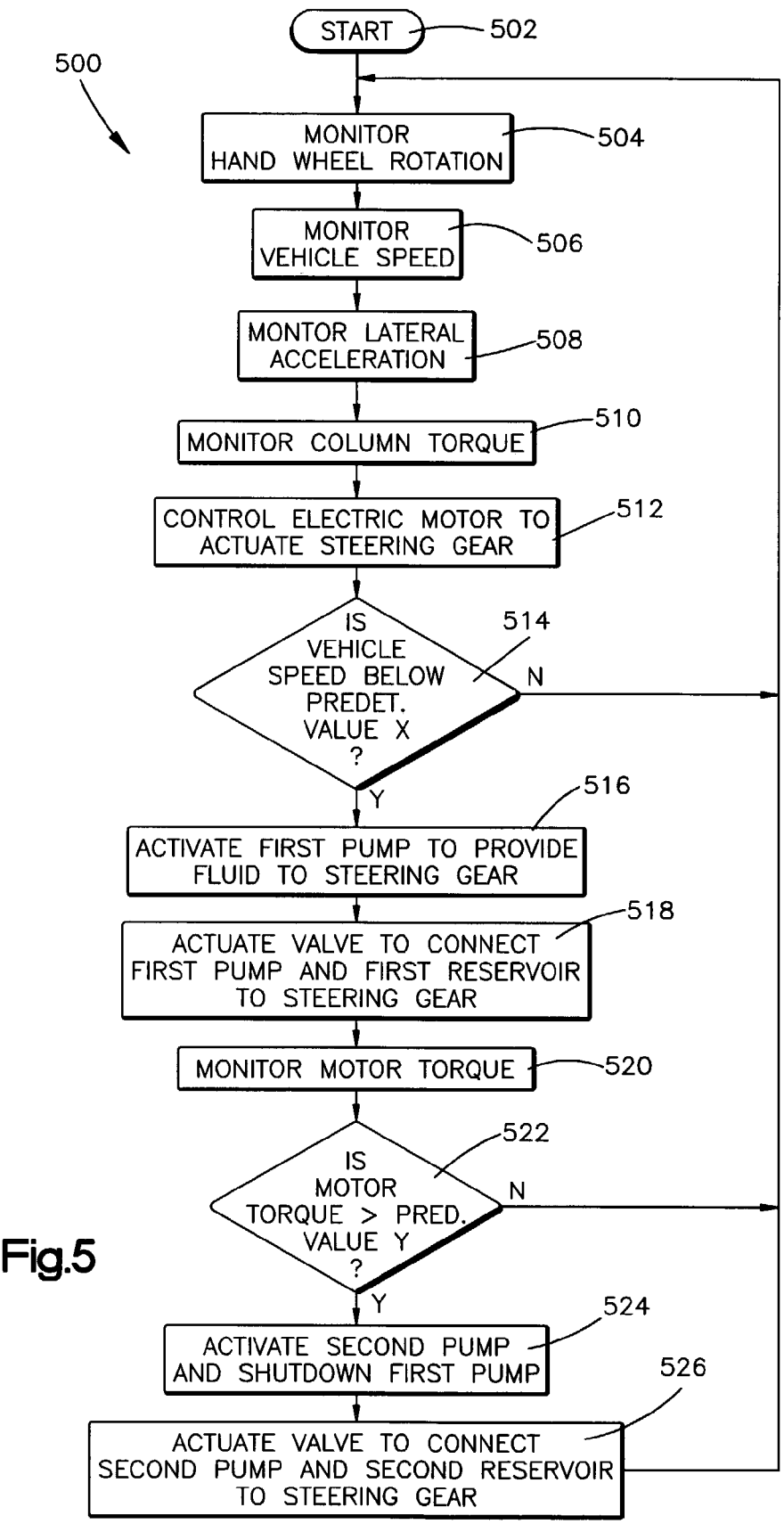
FIG. 5 is a process diagram of a control process for the apparatus of FIG. 4.

FIG. 5 is a flow chart illustrating the process 500 performed by the controller 104 of FIG. 5. The process 500 begins at step 502. At step 504, the controller 104 monitors the hand wheel 14 rotation. At step 506, the controller 104 monitors the vehicle speed. At step 508, the controller 104 monitors the lateral acceleration of the vehicle and, the column torque is monitored at step 510. At step 512, the controller 104 analyzes the signals received at steps 504, 506, 508, and 510 and outputs the control signal to control the electric motor 92. The electric motor 92 is controlled to provide a predetermined resistance to rotation of the hand wheel 14. At step 514, a determination is made as to whether the vehicle speed is below a first predetermined value X. If the determination at step 514 is negative, the process 500 returns to step 504. If the determination at step 514 is affirmative, the process 500 proceeds to step 516.

At step 516, the controller 104 activates the first pump 124 to supply fluid to the control valve 44 of the steering gear 16. From step 516, the process 500 proceeds to step 518. At step 518, the controller 104 actuates the two-position valve assembly 32 into the first position so that the first pump 124 and the first reservoir 126 are in fluid communication with the steering gear 16, as shown in FIG. 4.

At step 520, the controller 104 monitors the motor torque of the electric motor 92. The process 500 then proceeds to step 522 in which a determination is made as to whether the motor torque from step 520 is greater then a second predetermined value Y. If the determination at step 522 is negative, the controller 104 assumes that the apparatus 10B is properly operating and the process 500 returns to step 504. If the determination at step 522 is affirmative and the motor torque is above the second predetermined value Y, the controller 104 assumes that the hydraulic motor 28 of the steering gear 16 is not responding properly to actuation of the steering gear 16 by the electric motor 92. From step 522, the process 500 proceeds to step 524. At step 524, the controller 104 activates the second pump 130 to supply fluid to the control valve 44 of the steering gear 16. Also, at step 524, the controller 104 shuts down the first pump 124. From step 524, the process 500 proceeds to step 526. At step 526, the controller actuates the two-position valve assembly 138 into the second position so that the second pump 130 and the second reservoir 132 are in fluid communication with the steering gear 16. Thus, in response to motor torque above the second predetermined value Y, the controller 104 places the second fluid supply source 122 in fluid communication with the steering gear 16 and isolates the first fluid supply source 120 from fluid communication with the steering gear 16.

As illustrated in the process 500 of FIG. 5, the apparatus 10B of FIG. 4 includes redundant first and second fluid supply systems 120 and 122, each including a pump 124 and 130, respectively, and a reservoir 126 and 132, respectively. The controller 104 of the apparatus 10B generally activates the first pump and places the first fluid supply system 120 in fluid communication with the steering gear 16 when the vehicle speed is below a first predetermined value X. If the first pump 124 is activated and the first fluid supply system 120 is in fluid communication with the steering gear 16 and a determination is made that the motor torque is greater than the second predetermined value Y, the controller 104 of the apparatus 10B shuts down the first pump 124, activates the second pump 130, and places the second fluid supply system 122 in fluid communication with the steering gear 16. Thus, the apparatus 10B of the present invention provides redundant systems 120 and 122 for supplying hydraulic fluid to the control valve 44 of the steering gear 16.

Figure 6:
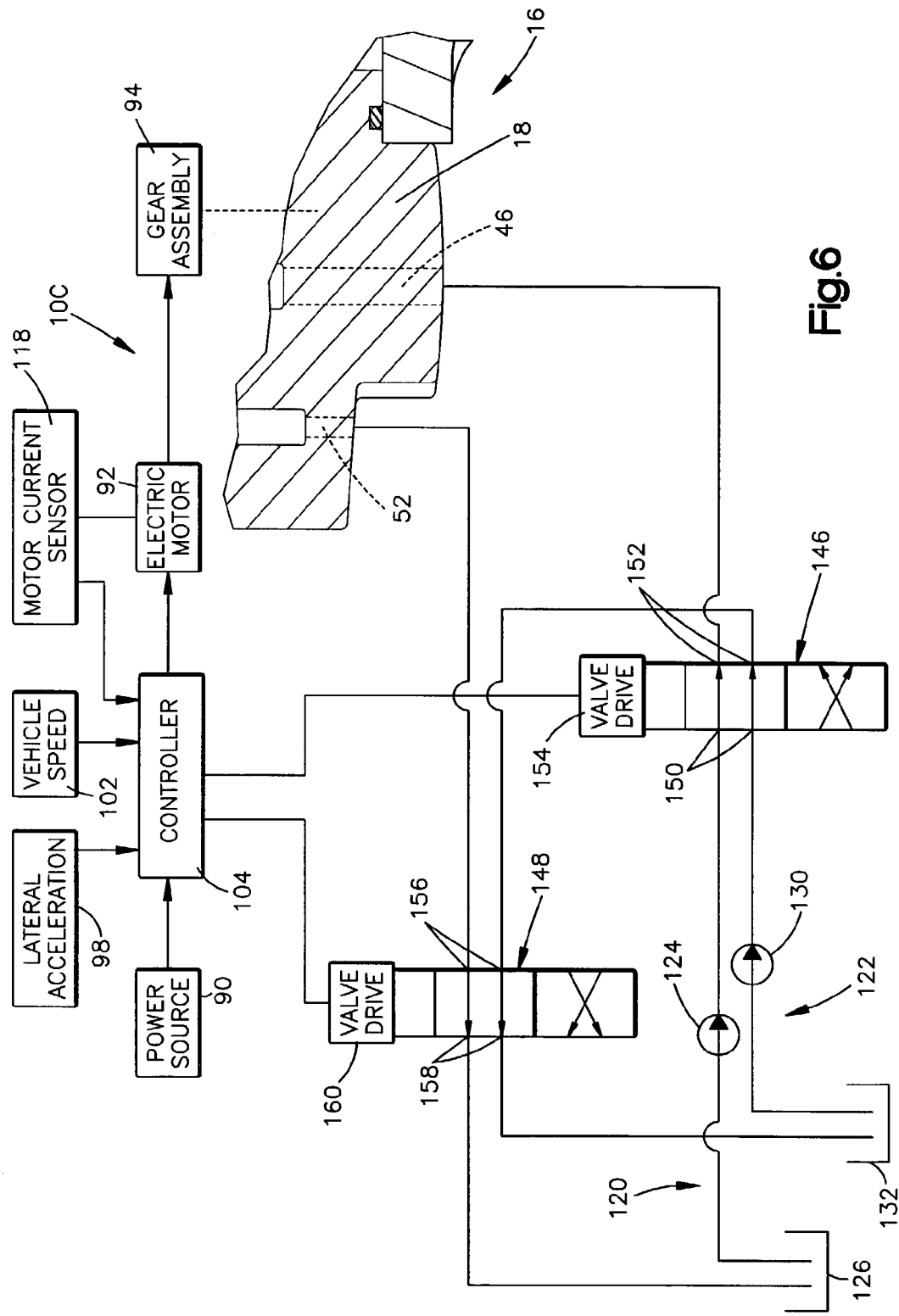
FIG. 6 is a schematic illustration of an apparatus constructed in accordance with a fourth embodiment of the present invention.

FIG. 6 illustrates an apparatus 10C constructed in accordance with a fourth embodiment of the present invention. Structures of FIG. 6 that are the same as or similar to structures of FIG. 4 are numbered using the same reference numbers and are not discussed in detail with regard to FIG. 6. Only the differences between the apparatus 10B of FIG. 4 and the apparatus 10C of FIG. 6 are discussed in detail below. FIG. 6 only illustrates a portion of the steering gear 16, including the fluid inlet 46 and outlet 52 of the steering gear 16. It is to be understood that the steering gear 16 of the apparatus 10C of FIG. 6 is identical to the steering gear 16 of FIG. 4.

The apparatus 10C of FIG. 6 also includes first and second fluid supply systems 120 and 122, respectively, each of which is shown schematically in FIG. 6. The apparatus 10C of FIG. 6 also includes two separate and distinct two-position valve assemblies, a supply valve 146 and a return valve 148.

The supply valve 146 includes parallel inlets 150 and parallel outlets 152. The first and second pumps 124 and 130, respectively, are connected to the inlets 150 of the supply valve 146, each pump to a respective inlet. One of the outlets 152 of the supply valve 146 is connected to the inlet 46 of the steering gear 16 and the other outlet 152 is connected to an inlet 156 of the return valve 148.

The supply valve 146 has first and second positions. In a first position, shown in FIG. 6, the supply valve 146 places the first pump 124 in fluid communication with the inlet 46 of the steering gear 16 and places the second pump 130 in fluid communication with the return valve 148. In the second position, the supply valve 146 places the second pump 130 in fluid communication with the inlet 46 of the steering gear 16 and places the first pump 124 in fluid communication with the return valve 148.

A valve drive 154 is connected to the supply valve 146 for actuating the supply valve between the first and second positions. The valve drive 154 is preferably a solenoid. The valve drive 154 is operatively connected to the controller 104 and the controller controls actuation of the valve drive 154.

The return valve 148 also includes parallel inlets 156 and parallel outlets 158. An outlet 152 of the supply valve 146 is connected to one of the inlets 156 of the return valve 148 and the outlet 52 of the steering gear 16 is connected to the other inlet 156 of the return valve 148. One of the outlets 158 of the return valve 148 is connected to the first reservoir 126 and the other outlet 158 is connected to the second reservoir 132.

The return valve 148 has first and second positions. In a first position, shown in FIG. 6, the return valve 148 connects the outlet 52 of the steering gear 16 to the first reservoir 126 and connects the outlet 152 of the supply valve 146 to the second reservoir 132. In the second position, the return valve 148 connects the outlet 52 of the steering gear 16 to the second reservoir 132 and connects the outlet 152 of the supply valve 146 to the first reservoir 126.

A valve drive 160 is connected to the return valve 148 for actuating the return valve 148 between the first and second positions. The valve drive 160 is preferably a solenoid. The valve drive 160 is operatively connected to the controller 104 and the controller controls actuation of the valve drive.

The apparatus 10C of FIG. 6 is controlled in a manner similar to the apparatus 10B of FIG. 4. When the controller 104 determines that the vehicle speed is below the first predetermined value X, the controller 104 activates the first pump 124 and places the first fluid supply source 120 in fluid communication with the steering gear 16. If the controller 104 determines that the motor torque of electric motor 92 is above the second predetermined value Y while the first pump 124 is activated and in fluid communication with the steering gear 16, the controller 104 shuts down the first pump 124, activates the second pump 130, and actuates the supply and return valves 146 and 148 to place the second fluid supply source 122 in fluid communication with the steering gear 16.

Figure 7:
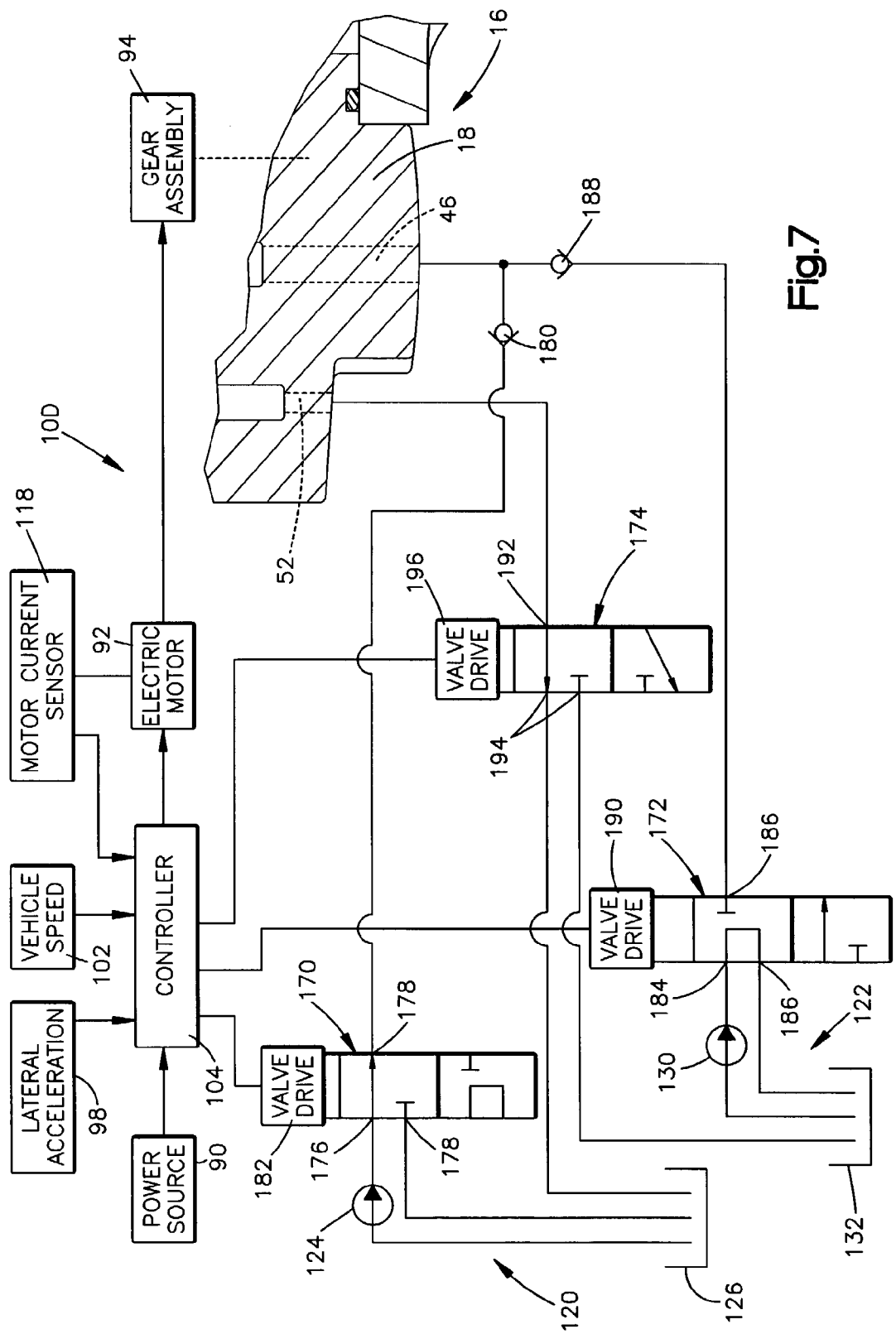
FIG. 7 is a schematic illustration of an apparatus constructed in accordance with a fifth embodiment of the present invention.

FIG. 7 illustrates an apparatus 10D constructed in accordance with a fifth embodiment of the present invention. Structures of FIG. 7 that are the same as or similar to structures of FIG. 6 are numbered using the same reference numbers and are not discussed in detail with regard to FIG. 7. Only the differences between the apparatus 10C of FIG. 6 and the apparatus 10D of FIG. 7 are discussed in detail below. Similar to FIG. 6, FIG. 7 only illustrates a portion of the steering gear 16, including the fluid inlet 46 and outlet 52 of the steering gear 16.

The apparatus 10D of FIG. 7 also includes first and second fluid supply systems 120 and 122, respectively, each of which is shown schematically in FIG. 7. The apparatus 10D of FIG. 7 also includes three separate and distinct two-position valve assemblies, first and second supply valves 170 and 712, respectively, and a return valve 174.

The first supply valve 170 controls fluid flow from the first fluid supply system 120 and includes a single inlet 176 and two outlets 178. The first pump 124 is connected to the inlet 176 of the first supply valve 170. One of the outlets 178 of the first supply valve 170 is connected to the inlet 46 of the steering gear 16, through a check valve 180, and the other outlet 178 of the first supply valve 170 is connected to the first reservoir 126.

The first supply valve 170 has first and second positions. In a first position, shown in FIG. 7, the first supply valve 170 places the first pump 124 in fluid communication with the inlet 46 of the steering gear 16. In the second position, the first supply valve 170 places the first pump 124 in fluid communication with the first reservoir 126.

A valve drive 182 is connected to the first supply valve 170 for actuating the first supply valve 170 between the first and second positions. The valve drive 182 is preferably a solenoid. The valve drive 182 is operatively connected to the controller 104 and the controller controls actuation of the valve-drive 182.

The second supply valve 172 controls fluid flow from the second fluid supply system 122 and includes a single inlet 184 and two outlets 186. The second pump 130 is connected to the inlet 184 of the second supply valve 172. One of the outlets 186 of the second supply valve 172 is connected to the inlet 46 of the steering gear 16, through a check valve 188, and the other outlet 186 of the second supply valve 172 is connected to the second reservoir 132.

The second supply valve 172 has first and second positions. In a first position, shown in FIG. 7, the second supply valve 172 places the second pump 130 in fluid communication with the second reservoir 132. In the second position, the second supply valve 172 places the second pump 130 in fluid communication with the inlet 46 of the steering gear 16.

A valve drive 190 is connected to the second supply valve 172 for actuating the second supply valve between the first and second positions. The valve drive 190 is preferably a solenoid. The valve drive 190 is operatively connected to the controller 104 and the controller controls actuation of the valve drive 190.

The return valve 194 also includes a single inlet 192 and two outlets 194. The outlet 52 of the steering gear 16 is connected to the inlet 192 of the return valve 174. One of the outlets 194 of the return valve 174 is connected to the first reservoir 126 and the other outlet 194 is connected to the second reservoir 132.

The return valve 174 has first and second positions. In a first position, shown in FIG. 7, the return valve 174 places the outlet 52 of the steering gear 16 in fluid communication with the first reservoir 126. In the second position, the return valve 174 places the outlet 52 of the steering gear 16 in fluid communication with the second reservoir 132.

A valve drive 196 is connected to the return valve 174 for actuating the return valve between the first and second positions. The valve drive 196 is preferably a solenoid. The valve drive 196 is operatively connected to the controller 104 and the controller controls actuation of the valve drive.

The apparatus 10D of FIG. 7 is controlled in a manner similar to the apparatuses 10B and 10C of FIGS. 4 and 6, respectively. When the controller 104 determines that the vehicle speed is below the first predetermined value X, the controller 104 activates the first pump 124 and places the first fluid system 120 in fluid communication with the steering gear 16, i.e., places the first pump 124 in fluid communication with the inlet 46 of the steering gear 16 and places the outlet 52 of the steering gear 16 in fluid communication with the first reservoir 126. If the controller 104 determines that the motor torque of electric motor 92 is above the second predetermined value while the first pump 124 is activated and the first fluid system 120 is in fluid communication with the steering gear 16, the controller 104 shuts down the first pump 124, activates the second pump 130, and places the second fluid supply system 122 in fluid communication with the steering gear 16, i.e., places the second pump 130 in fluid communication with the inlet 46 of the steering gear 16 and places the outlet 52 of the steering gear 16 in fluid communication with the second reservoir 132.

Similar to the apparatuses 10 and 10A of FIGS. 1 and 3, the apparatuses 10B, 10C, and 10D of FIGS. 4, 6, and 7 provide a power assisted steering system that includes a hydraulic boost when the vehicle is operating at low speeds. The apparatuses 10B, 10C, and 10D of FIGS. 4, 6, and 7 also include redundant fluid supply systems 120 and 122 for supplying hydraulic fluid to a hydraulic motor 28 of a steering gear 16 for providing the hydraulic boost.

From the above description of the invention, those skilled in the art will perceive improvements, changes and modifications: Such improvements, changes and modifications within the skill of the art are intended to be covered by the appended claims.

Having described the invention, we claim the following:

1. An apparatus for helping to turn steerable wheels of a vehicle, the apparatus comprising:
    a hydraulic power-assisted steering gear;
    an electric motor for actuating the steering gear;
    a pump for supplying the steering gear with hydraulic fluid;
    a vehicle speed sensor for sensing vehicle speed and for providing a vehicle speed signal;
    a controller responsive to the vehicle speed signal for controlling the pump, the controller activating the pump to supply hydraulic fluid to the steering gear when the vehicle speed signal indicates a vehicle speed below a predetermined value and the controller deactivating the pump when the vehicle speed signal indicates a vehicle speed above the predetermined value; and
    wherein said electric motor is operatively connected to said steering gear to actuate said steering gear but not drive said pump.

2. The apparatus of claim 1 wherein the electric motor is responsive to rotation of a hand wheel of the vehicle for actuating the steering gear, the controller controlling the electric motor to provide a predetermined resistance to rotation of the hand wheel.

3. An apparatus for helping to turn steerable wheels of a vehicle, the apparatus comprising:
    a hydraulic power-assisted steering gear having a valve which is actuated to actuate the steering gear;
    an electric motor for actuating the steering gear;
    a pump for supplying the steering gear with hydraulic fluid;
    a vehicle speed sensor for sensing vehicle speed and for providing a vehicle speed signal;
    a controller responsive to the vehicle speed signal for controlling the pump, the controller activating the pump to supply hydraulic fluid to the steering gear valve when the vehicle speed signal indicates a vehicle speed below a predetermined value and the controller deactivating the pump when the vehicle speed signal indicates a vehicle speed above the predetermined value;
    wherein said electric motor is operatively connected to said steering gear to actuate said steering gear valve;
    an engine of the vehicle, when coupled to the pump, drives the pump to supply hydraulic fluid to the steering gear,
    said apparatus further including a clutch mechanism actuatable between a first condition that couples the pump to the engine and a second condition that decouples the pump from the engine, the controller controlling actuation of the clutch mechanism.

4. An apparatus for helping to turn steerable wheels of a vehicle, the apparatus comprising:
    a hydraulic power-assisted steering gear having a valve which is actuated to actuate the steering gear;
    an electric motor for actuating the steering gear, said electric motor is responsive to rotation of a hand wheel of the vehicle for actuating the steering gear;
    a pump for supplying the steering gear with hydraulic fluid;
    a vehicle speed sensor for sensing vehicle speed and for providing a vehicle speed signal;
    a controller responsive to the vehicle speed signal for controlling the pump, the controller activating the pump to supply hydraulic fluid to the steering gear valve when the vehicle speed signal indicates a vehicle speed below a predetermined value and the controller deactivating the pump when the vehicle speed signal indicates a vehicle speed above the predetermined value, said controller controlling the electric motor to provide a predetermined resistance to rotation of the hand wheel; and
    wherein said electric motor is operatively connected to said steering gear to actuate said steering gear valve.

5. The apparatus of claim 4 wherein said steering gear includes a torsion bar, a column torque sensor operatively connected to said torsion bar for sensing the column torque of said torsion bar and for providing a signal indicative of the column torque of said torsion bar, wherein said controller is responsive to said signal indicative of the column torque of said torsion bar for controlling the electric motor.

6. An apparatus for helping to turn steerable wheels of a vehicle, the apparatus comprising:
    an electric motor actuatable to turn the steerable wheels;
    a hydraulic power-assisted steering mechanism for assisting the electric motor to turn the steerable wheels at vehicle speeds below a predetermined value, said hydraulic power-assisted steering mechanism including a steering gear having a valve which is actuated to actuate the steering gear;
    a pump for supplying the hydraulic power-assisted steering mechanism with hydraulic fluid, said steering gear includes at least one chamber and wherein said valve is a control valve for directing the fluid from said pump to said chamber of said steering gear;
    a controller for controlling the pump, the controller activating the pump to supply hydraulic fluid to the steering gear valve of the hydraulic power-assisted steering mechanism when the vehicle speed is below the predetermined value and the controller deactivating the pump when the vehicle speed is above the predetermined value; and
    wherein said electric motor is operatively connected to said steering gear to actuate said steering gear valve.

7. The apparatus of claim 6 wherein said controller controls said electric motor based on the lateral acceleration f the vehicle.

8. The apparatus of claim 7 wherein said steering gear includes a torsion bar, a column torque sensor operatively connected to said torsion bar for sensing the column torque of said torsion bar and for providing a signal indicative of the column torque of said torsion bar, wherein said controller is responsive to said signal indicative of the column torque of said torsion bar for controlling the electric motor.

9. The apparatus of claim 6 including a torsion bar, wherein said control valve includes a valve core portion and a valve sleeve portion that are connected together through said torsion bar.

10. The apparatus of claim 9 wherein when the resistance to turning the steerable wheels is above a predetermined amount, said torsion bar causes said valve core portion to rotate relative to said valve sleeve portion to cause said control valve to direct the fluid from said pump to said chamber of said steering gear.

11. The apparatus of claim 6 wherein an engine of the vehicle, when coupled to the pump, drives the pump to supply hydraulic fluid to the hydraulic power-assisted steering mechanism, the apparatus further including a clutch mechanism actuatable between a first condition that couples the pump to the engine and a second condition that decouples the pump from the engine, the controller controlling actuation of the clutch mechanism.

12. The apparatus of claim 6 wherein said steering gear includes a torsion bar, a column torque sensor operatively connected to said torsion bar for sensing the column torque of said torsion bar and for providing a signal indicative of the column torque of said torsion bar, wherein said controller is responsive to said signal indicative of the column torque of said torsion bar for controlling the electric motor.

13. An apparatus for helping to turn steerable wheels of a vehicle, the apparatus comprising:
 a hydraulic power-assisted steering gear having a valve which is actuated to actuate the steering gear;
 an electric motor for actuating the steering gear;
 a pump for supplying the steering gear with hydraulic fluid;
 a vehicle speed sensor for sensing vehicle speed and for providing a vehicle speed signal;
 a controller responsive to the vehicle speed signal for controlling the pump, the controller activating the pump to supply hydraulic fluid to the steering gear valve when the vehicle speed signal indicates a vehicle speed below a predetermined value and the controller deactivating the pump when the vehicle speed signal indicates a vehicle speed above the predetermined value;
 wherein said electric motor is operatively connected to said steering gear to actuate said steering gear valve; and
 a lateral acceleration sensor for sensing the lateral acceleration of the vehicle and for providing a lateral vehicle acceleration signal, wherein said controller is responsive to the lateral vehicle acceleration signal for controlling the electric motor.

14. The apparatus of claim 13 wherein said steering gear includes a torsion bar, a column torque sensor operatively connected to said torsion bar for sensing the column torque of said torsion bar and for providing a signal indicative of the column torque of said torsion bar, wherein said controller is responsive to said signal indicative of the column torque of said torsion bar for controlling the electric motor.

15. An apparatus for helping to turn steerable wheels of a vehicle, the apparatus comprising:
 a hydraulic power-assisted steering gear having a valve which is actuated to actuate the steering gear; said steering gear includes at least one chamber and wherein said valve is a control valve for directing the fluid from said pump to said chamber of said steering gear;
 an electric motor for actuating the steering gear;
 a pump for supplying the steering gear with hydraulic fluid;
 a vehicle speed sensor for sensing vehicle speed and for providing a vehicle speed signal;
 a controller responsive to the vehicle speed signal for controlling the pump, the controller activating the pump to supply hydraulic fluid to the steering gear valve when the vehicle speed signal indicates a vehicle speed below a predetermined value and the controller deactivating the pump when the vehicle speed signal indicates a vehicle speed above the predetermined value; and
 wherein said electric motor is operatively connected to said steering gear to actuate said steering gear valve.

16. The apparatus of claim 15 including a torsion bar, wherein said control valve includes a valve core portion and a valve sleeve portion that are connected together through said torsion bar.

17. The apparatus of claim 16 wherein when the resistance to turning the steerable wheels is above a predetermined amount, said torsion bar causes said valve core portion to rotate relative to said valve sleeve portion to cause said control valve to direct the fluid from said pump to said chamber of said steering gear.

18. An apparatus for helping to turn steerable wheels of a vehicle, the apparatus comprising:
 a hydraulic power-assisted steering gear having a valve which is actuated to actuate the steering gear;
 an electric motor for actuating the steering gear;
 a pump for supplying the steering gear with hydraulic fluid, said electric motor does not drive said pump;
 a vehicle speed sensor for sensing vehicle speed and for providing a vehicle speed signal;
 a controller responsive to the vehicle speed signal for controlling the pump, the controller activating the pump to supply hydraulic fluid to the steering gear valve when the vehicle speed signal indicates a vehicle speed below a predetermined value and the controller deactivating the pump when the vehicle speed signal indicates a vehicle speed above the predetermined value; and
 wherein said electric motor is operatively connected to said steering gear to actuate said steering gear valve.

* * * * *